(12) United States Patent
Chesson

(10) Patent No.: US 7,675,857 B1
(45) Date of Patent: Mar. 9, 2010

(54) METHOD AND APPARATUS TO AVOID NETWORK CONGESTION

(75) Inventor: Gregory L. Chesson, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 485 days.

(21) Appl. No.: 11/799,826

(22) Filed: May 2, 2007

Related U.S. Application Data

(60) Provisional application No. 60/797,644, filed on May 3, 2006.

(51) Int. Cl.
H04L 12/56 (2006.01)
(52) U.S. Cl. .................................................... 370/235
(58) Field of Classification Search ................... None
See application file for complete search history.

(56) References Cited

U.S. PATENT DOCUMENTS

| | | | |
|---|---|---|---|
| 6,839,768 B2 * | 1/2005 | Ma et al. ................... | 709/235 |
| 6,894,974 B1 * | 5/2005 | Aweva et al. ............. | 370/230.1 |
| 7,272,111 B2 * | 9/2007 | Zukerman et al. .......... | 370/230 |
| 7,474,668 B2 * | 1/2009 | Bauman et al. ............. | 370/412 |

* cited by examiner

Primary Examiner—Anh-Vu Ly
(74) Attorney, Agent, or Firm—Park, Vaughan & Fleming LLP

(57) ABSTRACT

One embodiment of the present invention provides a system that avoids network congestion. During operation, the system can detect an onset of congestion in a first queue at a first node. Next, the first node can generate a first control-message, wherein the first control-message contains a congestion-point identifier which is associated with the first queue. The first node can then send the first control-message to a second node, which can cause the second node to delay sending a second message to the first node, wherein the second message is expected to be routed through the first queue at the first node. Next, the second node may propagate the control-message to a third node which may cause the third node to delay sending a third message to the second node, wherein the third message is expected to be routed through the first queue at the first node.

24 Claims, 5 Drawing Sheets

METHOD AND APPARATUS TO AVOID NETWORK CONGESTION

RELATED APPLICATION

This application hereby claims priority under 35 U.S.C. § 119 to U.S. Provisional Patent Application No. 60/797,644, filed on 3 May 2006, entitled "ACTIVE BURST CONTROL." The contents of this provisional patent application are hereby incorporated by reference.

BACKGROUND

1. Field of the Invention

The present invention generally relates to communication networks. More specifically, the present invention relates to techniques and systems to avoid congestion in a network.

2. Related Art

Network congestion is usually a consequence of nonexistent or inadequate flow controls below the transport protocol layer in conjunction with dynamic traffic bursts that oversubscribe underlying memories and queues. The lack of flow control is usually accepted as the status quo for several reasons. First, congestion mitigation at the transport layer can be reasonably effective for certain types of connections. Second, small networks with well-behaved traffic patterns may not experience congestion. Third, popular datalink layer protocols (e.g., Ethernet) and network layer protocols (e.g., Internet Protocol) are connectionless. Hence, it can be difficult to implement anything but coarse-grained flow control using such protocols. Fourth, the typical networking stack does not provide a control path between low-layer queues and higher-layer flow control entities.

Conventional techniques usually do not prevent or control congestion onset. Instead, they typically reduce the offered load from hosts by responding after congestion loss has occurred. Conventional techniques are usually based on the following concept: if hosts reduce their load by a sufficient amount when congestion is detected (or suspected), the sum of their loads at congestion points will decrease, thereby mitigating congestion. These conventional techniques were typically developed to keep the network core as simple as possible while pushing adaptation techniques to the endpoints of the network.

Unfortunately, conventional techniques for combating congestion are not effective in many emerging network applications such as latency-sensitive applications and large-scale distributed applications. Specifically, latency-sensitive applications pay a penalty (e.g., increased and/or variable latency) when conventional techniques are used to mitigate congestion. Further, large-scale distributed applications have bursty traffic loads that are difficult, and sometimes impossible, to mitigate with after-the-event response techniques. Observations within contemporary datacenter networks suggest that congestion loss caused by rapid traffic bursts may be an increasing problem as distributed applications continue to grow and mature.

SUMMARY

One embodiment of the present invention provides a system that avoids network congestion. During operation, the system can detect an onset of congestion in a first queue at a first node. The first node may be coupled to a second node using a first link. Next, the first node can generate a first control-message, wherein the first control-message contains a congestion-point identifier which is associated with the first queue. The congestion-point identifier can be unique within a network, i.e., each queue in the network can be associated with a distinct congestion-point identifier. The first node can then send the first control-message to the second node through the first link, which can cause the second node to delay sending a second message to the first node, wherein the second message is expected to be routed through the first queue at the first node.

The first queue may contain a first message that was received from the second node. If the first queue does not contain a message that was received from the second node, the first node may not send a control-message to the second node. Upon receiving the first control-message from the first node, the second node may decide not to delay a third message if the third message is not expected to be routed through the first queue at the first node.

The second node may receive the first control-message which may contain the congestion-point identifier. Next, the second node may receive a second message, which is expected to be routed through the first queue at the first node. The second node may then use information contained in the first control-message to determine whether to delay the second message. Next, the second node may delay the second message by queuing the second message in a second delay-queue at the second node.

The second node may generate a second control-message at the second node which may contain the congestion-point identifier. Next, the second node may send the second control-message to a third node through a second link, wherein the second node is coupled to the third node using the second link. Note that sending the second control-message to the third node may cause the third node to delay sending a fourth message to the second node which is expected to be routed through the first queue at the first node.

A system may detect the onset of congestion in the first queue by first determining a difference between an arrival rate of the first queue and an egress rate of the first queue. Next, the system may determine the onset of congestion by comparing the difference with a threshold. Alternatively, the system may detect the onset of congestion by comparing the number of messages in the queue with the threshold. The system may determine the threshold by: determining a burst duration; determining the number of messages in the first queue; and determining the threshold using the number of messages and the burst duration.

The first node may send a routing-information message to the second node. The routing-information message may contain the congestion-point identifier, and the routing-information message may enable the second node to determine whether the second message is expected to be routed through the first queue at the first node.

The second node may send a second routing-information message to the third node, wherein the second routing-information message may enable the third node to determine whether a message is expected to be routed through the first queue at the first node.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Network

Figure 1:
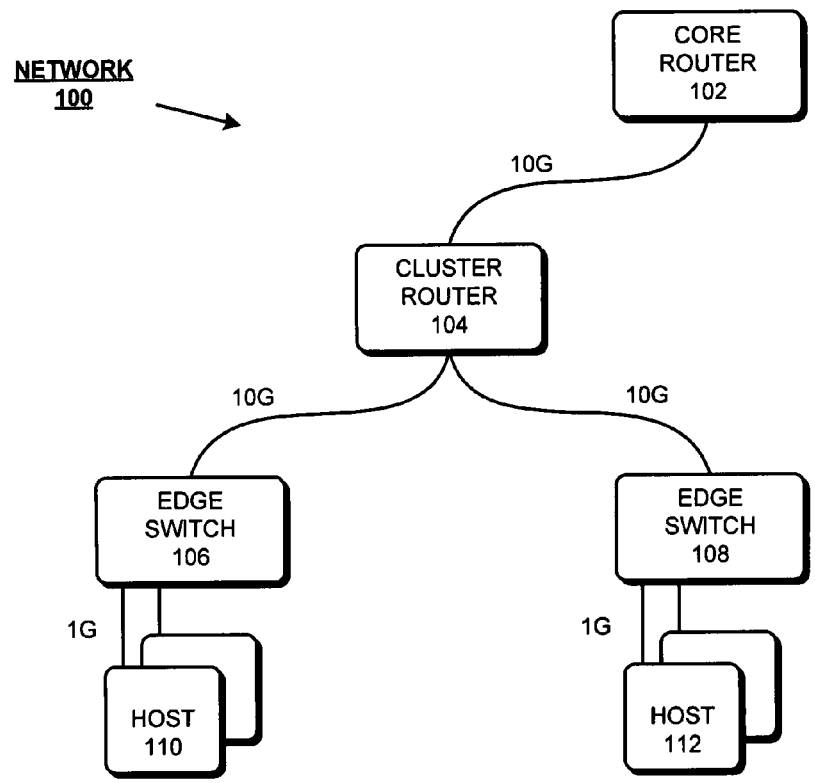
FIG. 1 illustrates a network in accordance with an embodiment of the present invention.

FIG. 1 illustrates a network in accordance with an embodiment of the present invention.

Network 100 comprises core router 102, cluster router 104, edge switches 106 and 108, and hosts 110 and 112. Core router 102 is coupled with cluster router 104 using a 10 Gbps (Gigabits per second) link. Cluster router 104 is coupled with edge switches 106 and 108 using 10 Gbps links. Edge switches 106 and 108 are coupled with hosts 110 and 112 using 1 Gbps links.

Network 100 can be part of a larger network. For example, core router 100 may be coupled with other core routers and/or other cluster routers. Embodiments of the present invention are not limited to the topology, technology, or architecture of network 100.

A network can generally include network nodes that are coupled together using wired or wireless communication channels. This includes, but is not limited to, a local area network, a wide area network, or a combination of networks. In one embodiment, a network can include the Internet.

A network node (or "node" for short) can generally include any type of device capable of communicating with other devices via a network. This includes, but is not limited to, a computer system based on a microprocessor, a mainframe computer, a printer, a router, a switch, a personal organizer, or a mobile phone. Network nodes shown in FIG. 1 include core router 102, cluster router 104, edge switches 106 and 108, and hosts 110 and 112.

Network Congestion

Queue capacities are typically engineered to ensure that queue overflow is unlikely. That is, the queues are designed to absorb a certain amount of burst data for a period of time during which the arrival rate of data at a queue exceeds the egress rate. But if the bandwidth and duration of a burst exceeds the queue capacity, the queue may overflow and messages may be dropped. The arrival of 10 Gbps networking gear and 10 Gbps host interfaces—a 10 fold increase in link bandwidth—has not been accompanied by a similar increase in queue capacity. This causes queues and memory buffers to become more vulnerable.

Figure 2:
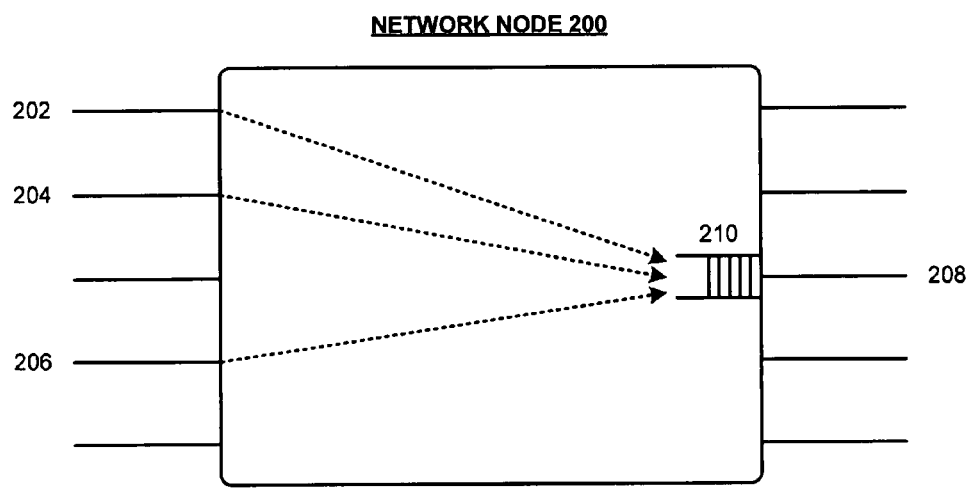
FIG. 2 illustrates how network congestion can occur at a network node in accordance with an embodiment of the present invention.

FIG. 2 illustrates how network congestion can occur at a network node in accordance with an embodiment of the present invention.

Network node 200 comprises ports 202, 204, 206, and 208. Queue 210 stores messages before they are sent out on port 208. A message can generally comprise any information that can be sent from a source to one or more destinations. Specifically, a message can comprise one or more packets or one or more protocol data units.

Note that queue 210 has a limited capacity. Hence, queue 210 may overflow if network node 200 receives a sudden burst of messages on ports 202, 204, and 206 which need to be routed through port 208. If queue 210 overflows, messages may be dropped or lost, thereby degrading network performance.

Some network connections connect a remote machine with a local machine within a company's network. Such connections are usually routed through a variety of network elements that have different bandwidths and which are controlled by different organizations. Hence, it is not surprising that such connections often experience congestion. However, congestion can also occur in a company's internal network where all network elements are controlled by a single organization. This type of congestion may not be due to improper circuit provisioning or poor network design. Instead, congestion may occur because of the bursty and unpredictable nature of network traffic.

A network is typically designed with a range of traffic patterns in mind. But if the traffic pattern varies beyond that range, congestion can occur. Specifically, in a distributed application, if a host sends a request to a number of nodes in a cluster, the nodes may simultaneously send their responses which may cause congestion at the edge router that is coupled with the host.

Congestion can be solved for long term connections by appropriately adjusting the transmission rate. However, when a computer exchanges messages (which can be in the megabytes) with thousands of other computers (e.g., in a distributed application), we typically cannot use conventional techniques for combating congestion because they are not that effective in such situations. This is because when a computer exchanges messages with thousands of computers, it can cause extremely heavy loads for a very short duration that can overwhelm a queue and cause congestion loss. Conventional techniques are usually not designed to adapt to such short bursts.

One approach to combat congestion is to require the network core to constantly communicate with the hosts to tell them the bandwidth that the network can handle at any given time. However, this approach has drawbacks. Specifically, the host may be a number of hops away from the core which will cause a substantial delay between the host and the core, and hence the core may not be able to tell the host to reduce its transmission rate in time to prevent congestion.

Another approach is to use fast-acting, fine-grained flow control between endpoints. Although such techniques may be appropriate for implementing flow-control between two hosts, they are usually not scalable. Hence, such techniques may not be able to handle situations where the congestion point is multiple hops away from the source nodes, and where the congestion is due to the simultaneous behavior of thousands of hosts.

Although flow control credit schemes and ARQ (Automatic Repeat reQuest) schemes are similar, they usually operate at different levels of granularity and resolution. The term "granularity" generally refers to the information units that are being controlled, e.g., messages, packets, etc. The term "resolution" generally refers to the level at which the controls operate.

A low-resolution or coarse-grained technique may treat a physical channel as a single flow-controlled entity, even if it is carrying many TCP (Transport Control Protocol) connections. A medium-resolution technique may identify and control multiple TCP flows at once. For example, a medium-resolution technique may bundle TCP flows based on shared destination or shared port or shared buffer resource or perhaps shared QoS (Quality of Service) level. A high-resolution technique may identify and control individual TCP flows.

Ethernet provides a low-resolution link flow control with 802.3 PAUSE messages. However, this technique is not widely employed because of the indiscriminate head-of-line blocking effect when all traffic on a shared link is stopped. High-resolution controls are usually not used in networks because of their complexity and also because they conflict with existing transport layer flow controls within end systems.

There are a number of conventional techniques for mitigating congestion. TCP halves its congestion window and reduces its slow start threshold when message loss is detected and congestion is presumed, and acts slowly to resume higher levels.

Some transport implementations provide rate-limiting and/or constant rate output disciplines. This can be effective for engineered network flows where the rates can be provisioned to avoid congestion or to operate effectively over high delay links, e.g. satellite channels, where it is impractical to maintain window sizes comparable to the delay-bandwidth product of the end-to-end path.

Routers can forward ECN (Explicit Congestion Notification) messages from the network to an end node. This may be faster than detecting congestion via message loss and can be viewed as an acceleration method for transport layer congestion avoidance. Unfortunately, the end node that receives the ECN is usually not the one causing congestion, so the congestion notification is typically sent back to the originating node where it triggers a transport level back-off.

In Frame Relay or ATM (Asynchronous Transmission Mode), a switch can send a congestion notification to either endpoint of a virtual circuit. Forward ECN sends the notification toward the destination of a flow, similar to ECN (above). Backward ECN sends notification back to the source, avoiding the boomerang route from destination back to source.

BCN (Backward Congestion Notification) is a proposed mechanism under consideration in the IEEE (Institute of Electrical and Electronic Engineers) 802.1 working group. A router samples its ingress streams and monitors (only) its rate-controlled output queues for their fullness. A monitored queue is known as a "congestion point" in the BCN framework and must have associated with it a unique congestion-point identifier (CPID). A subset of packets arriving at a congestion point are sampled. BCN packets are transmitted back to the origination points of sampled packets. The Destination Address (DA) and Source Address (SA) of a sampled packet are reversed and become the SA and DA, respectively, of a BCN packet. The BCN packets inform the sender of the degree of fullness of the reporting queue.

When a queue is congested, the backward-flowing BCN packets cause routers sending to that queue to direct their outgoing packets through rate-limited queues. The rates at these queues may be adjusted upwards or downwards in response to received BCN packets. Over time, the network of originating queues may converge to a fixed point that stabilizes the loads in the congested queues.

BCN has several interesting properties. First, the queue measurements are triggered by packet arrival rather than being performed periodically. Second, BCN control content is generated based on the number of packets in the queue, not on an assessment of packet rate or rate of change. Third, BCN messages include an encoding for "extreme congestion" which requires the originating queue to halt transmission to the congested queue for a random period of time.

However, BCN also has drawbacks. First, if a congestion point is being saturated by traffic from 100 senders and the input traffic is sampled with probability p=0.01, the queue may have to receive 10,000 packets or more before all 100 senders receive a BCN control message. Second, the BCN proposal seems to be directed to generate control messages at the core of a network, and to send the control messages out to the edge devices. Hence, the BCN proposal may not be able to enable edge devices to generate flow control messages that would propagate through the core and back out to other edge devices.

Process to Avoid Network Congestion

Burst congestion loss may occur when the excess bandwidth and duration of a burst exceeds the capacity of one or more queues. The excess bandwidth, or magnitude, of the burst can be the difference between the message arrival rate and the message egress rate at the affected queue. The duration can be the length of time of the excess load. If the product of the magnitude and the duration exceeds the capacity of the queue, messages may be dropped.

Conventional techniques to avoid congestion are usually not effective when network traffic consists of frequent bursts with large magnitude and short duration. Specifically, conventional techniques such as BCN usually react after the burst has passed, or sometimes not at all (because the burst duration is shorter than the congestion control sampling period). In other words, conventional techniques usually cannot avoid burst congestion because their reaction time constants are typically greater than the burst durations.

In one embodiment, the system detects an onset of congestion by monitoring message arrival rates and egress rates. Onset detection can then trigger a wavefront of "freeze" control-messages that delays the bursting messages "in flight" as they progress through the network toward the congestion point. The freeze propagates backwards through the network from the congestion point toward the source(s) of the burst(s). The freeze may propagate all the way back to the source node(s) or it may propagate for a given number of hops.

Figure 3A:
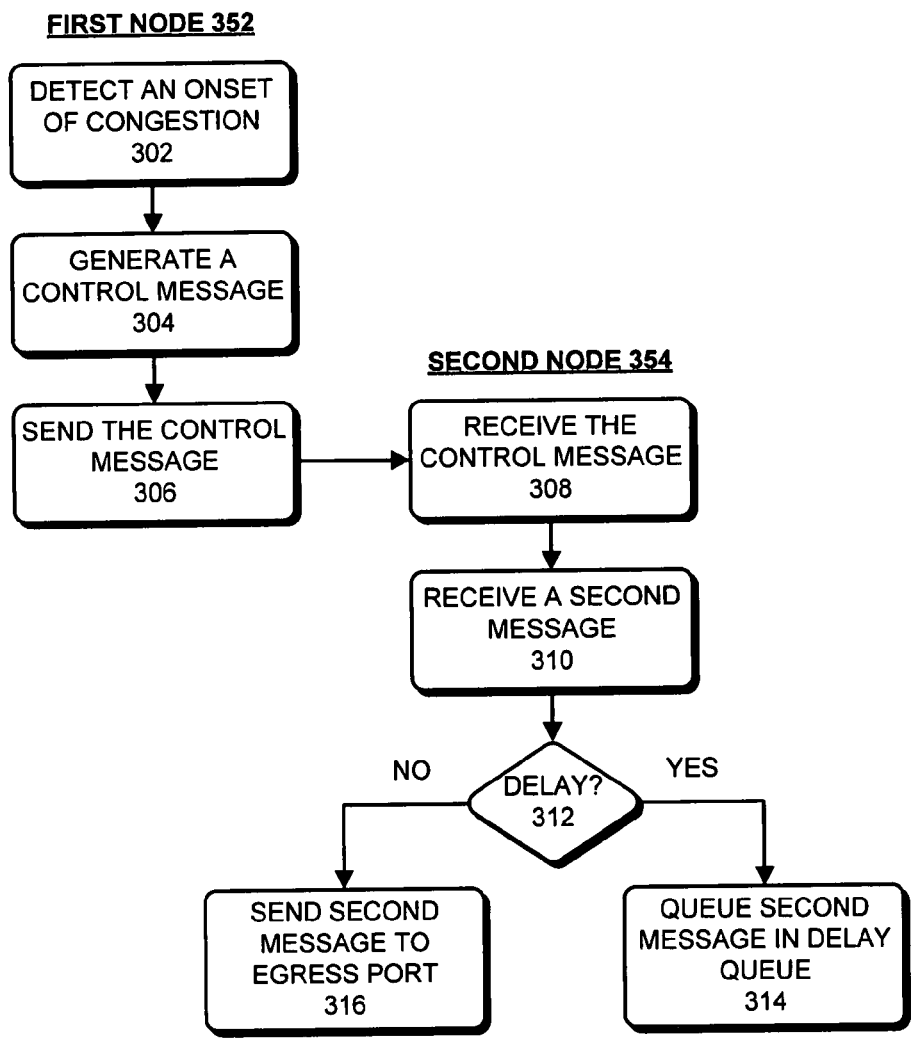
FIG. 3A presents a flowchart that illustrates a process for avoiding network congestion in accordance with an embodiment of the present invention.

FIG. 3A presents a flowchart that illustrates a process for avoiding network congestion in accordance with an embodiment of the present invention.

Figure 3B:
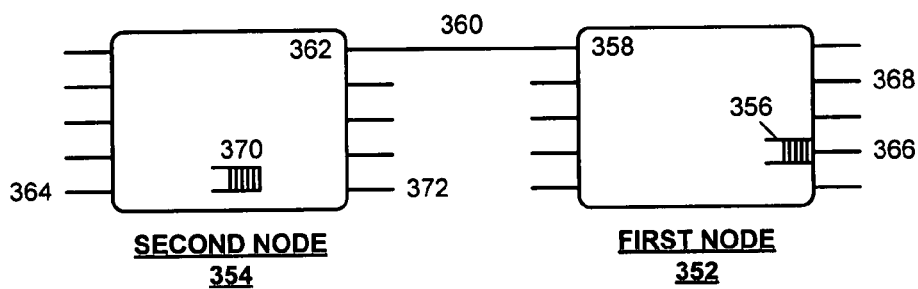
FIG. 3B illustrates how a network node can avoid network congestion in accordance with an embodiment of the present invention.

FIG. 3B illustrates how a network node can avoid network congestion in accordance with an embodiment of the present invention.

The process can begin by detecting an onset of congestion in a first queue at a first node (step 302).

First node 352 may be coupled to second node 354 using link 360. Specifically, link 360 couples port 358 on first node 352 with port 362 on second node 354. Queue 356 can contain a message that was received from second node 354. For example, the message may have been received on port 358 from second node 354 through link 360.

Figure 4:
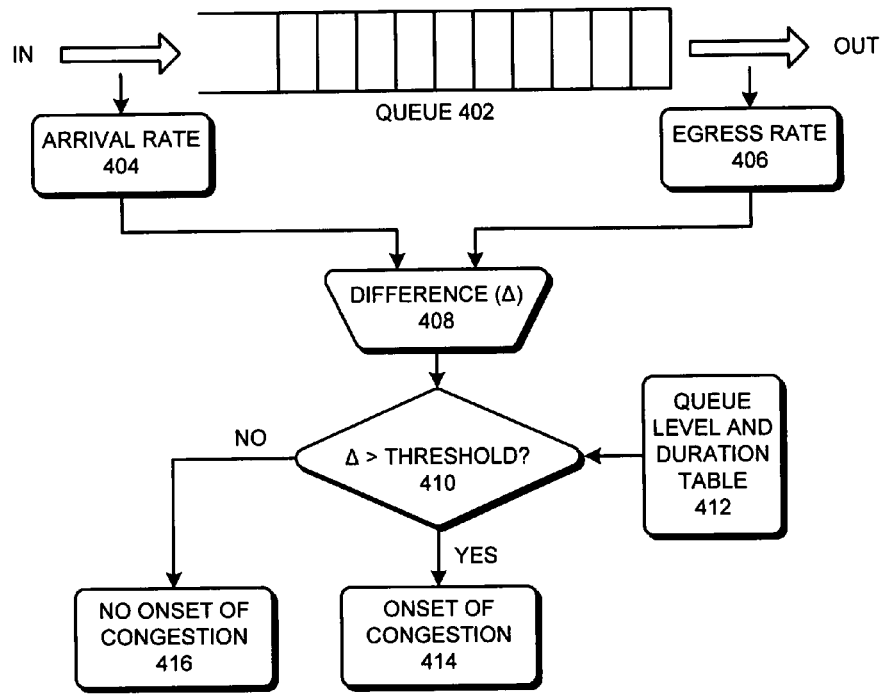
FIG. 4 illustrates how a node can detect an onset of congestion in a queue in accordance with an embodiment of the present invention.

FIG. 4 illustrates how a node can detect an onset of congestion in a queue in accordance with an embodiment of the present invention.

Queue 402 can be an input queue, an internal queue, an output queue, or any other kind of queue which is used to store messages within a node. Messages may arrive at queue 402 at arrival rate 404, and egress from queue 402 at egress rate 406.

A system (e.g., a node) may determine an onset of congestion in queue 402 using the following process. First, the system may determine a difference 408 between arrival rate 404 and egress rate 406. The arrival rate and the egress rate may be detected using a message counter that is sampled at a constant rate. The counter may be cleared after each sample is taken. Note that the sampling rate can be a tunable implementation parameter.

Next, the system may compare difference 408 with a threshold to determine whether an onset of congestion has occurred (step 410). For example, if difference 408 is greater than the threshold, the system may determine that it has detected an onset of congestion in queue 402 (step 414). On the other hand, if difference 408 is less than the threshold, the system may determine that it has not detected an onset of congestion (step 416). The system may detect an onset of congestion when the product of difference 408 and the duration of the burst exceeds a threshold.

In one embodiment, the system can determine the threshold using table 412 that stores queue levels and burst duration values. Specifically, the system may first determine a queue level (e.g., the number of messages in the queue). Next, the system may determine a duration of the burst. The system can then determine the threshold using the queue level and the duration value. For example, the table can be a 2D (two dimensional) table wherein one dimension is associated with the queue level and the other dimension is associated with the duration value. In this embodiment, the system may lookup the threshold by performing a 2D lookup on the table using the queue level and the duration value.

Note that conventional techniques usually combat congestion after it occurs. Specifically, conventional techniques typically assume that congestion has occurred in the network when a message is lost. In contrast, an embodiment of the present invention is directed to detect congestion before it occurs.

Successful detection of an onset of congestion may depend on accurate settings for the thresholds. Incorrect settings could lead to false detects, i.e., the system may trigger a control-message when there isn't any congestion (false positive), or the system could miss a congestion event (false negative). An adaptive technique can be implemented that observes congestion and the rate changes that indicate the onset of congestion. The technique can then adaptively determine the threshold and the values in the 2D lookup table. The system may initialize with default settings or with table entries provided by a system administrator. In one embodiment, the adaptive technique may adjust the threshold and the values in the 2D lookup table to minimize the number of false positives and false negatives.

Continuing with the discussion of FIG. 3A, the first node can then generate a control-message (step 304). In one embodiment, the control-message can include a congestion-point identifier which is associated with queue 356. Further, the control-message may also include a source address, a destination address, a delay amount, and a hop count.

In general, a congestion-point identifier is an identifier that enables a network node to uniquely identify a congested queue within a relevant portion of the network. The relevant portion of the network can depend on the network connectivity and the number of hops that a message traverses. For example, if the message traverses a large number of hops in a network with high connectivity, the relevant portion of the network may be larger than if the message traverses a few hops in a network with low connectivity. In one embodiment, a congestion-point identifier can include a node-identifier that uniquely identifies a node within a network, and a queue-identifier which uniquely identifies a queue within a node. The node-identifier can be a network address such as an IP address that uniquely identifies the node within the network. The queue-identifier can be a port number that uniquely identifies an output queue within a node. In some cases, and particularly where the congested queue is associated with a host computer system or other end node, the destination IP address of a message may adequately identify a congestion point without need for a separate queue or port number.

In one embodiment, the control message can be an appropriately modified BCN message which uses the reserved bits in BCN control packet to indicate that the control message should not be treated as a standard BCN message. Note that the present invention is not limited to using the BCN message format. A control message can have a format that is similar to a BCN message, or the control message can have a completely different format that serves the purpose.

The first node can then send the control-message to a second node (step 306). For example, first node 352 can send the control-message to second node 354 through link 360. By sending the control-message, first node 352 can indicate to second node 354 that queue 356 may experience congestion if second node 354 continues to send messages at the current rate. In one embodiment, the control-message can be an Ethernet "PAUSE" message.

Once a node detects an onset of congestion in a queue, each new incoming message may generate a control message. The control message may be sent according to a moderation rule. Specifically, the control message may be sent only if no prior control message has already been sent for the same burst and to the same port. A benefit of using the moderation rule is that it enables the network to notify interior routers and switches as soon as possible without flooding the return path.

Note that control messages may be generated and transmitted using a number of techniques. For example, a single control message may be multicast to the port on which the triggering message was received. Alternatively, a single control message may be multicast to all ports. In yet another embodiment, a control message may be unicast to a congestion source.

Note that an embodiment may not detect individual flows that are causing congestion. Detecting individual flows can be costly based on current technology, and can also be the wrong approach for certain types of traffic patterns. Further, keeping track of individual flows may not be practical as the number of flows increases.

Continuing with the discussion of FIG. 3A, the control-message may then be received by the second node (step 308). Note that the control-message may contain the congestion-point identifier. The control-message may also contain routing information which enables the second node to determine whether a message is expected to be routed through a specific queue at the first node. In one embodiment, the congestion-point identifier may be stored in memory, e.g., in a routing table.

The second node can then receive a message that is expected to be routed through the first queue at the first node (step 310).

For example, second node 354 may receive a message on port 364. Information contained in the control message may enable second node 354 to determine whether the message that was received on port 364 is expected to be routed through queue 356 at first node 352.

Next, the second node can use the information contained in the control message to determine whether to delay the message (step 312).

If the second node determines that the message is to be delayed, it can delay the message by queuing the message in a delay queue at the second node (step 314). For example, second node 354 can delay the message by queuing the message in delay queue 370.

On the other hand, if the second node determines that the message is not to be delayed, it can send the message to the appropriate egress port (step 316). For example, second node 354 can send the message to egress port 372.

Note that conventional techniques usually suffer from head-of-line blocking. Specifically, in conventional techniques, when a queue experiences congestion (e.g., drops messages), all traffic is stopped. In contrast, an embodiment of the present invention may only delay traffic that is destined to the queue for which an onset of congestion has been detected.

In one embodiment, first node 352 can send a rapid sequence of pause messages to second node 354. The pause message can generally be any message that causes the receiving node to pause sending messages for a specified duration to the node that sent the pause message. By setting the duration of the pause messages to a very short interval, first node 352 can throttle down the amount of traffic it receives from second node 354, thereby alleviating the congestion in queue 356. In one embodiment, a pause message can be an Ethernet "PAUSE" frame.

Figure 5:
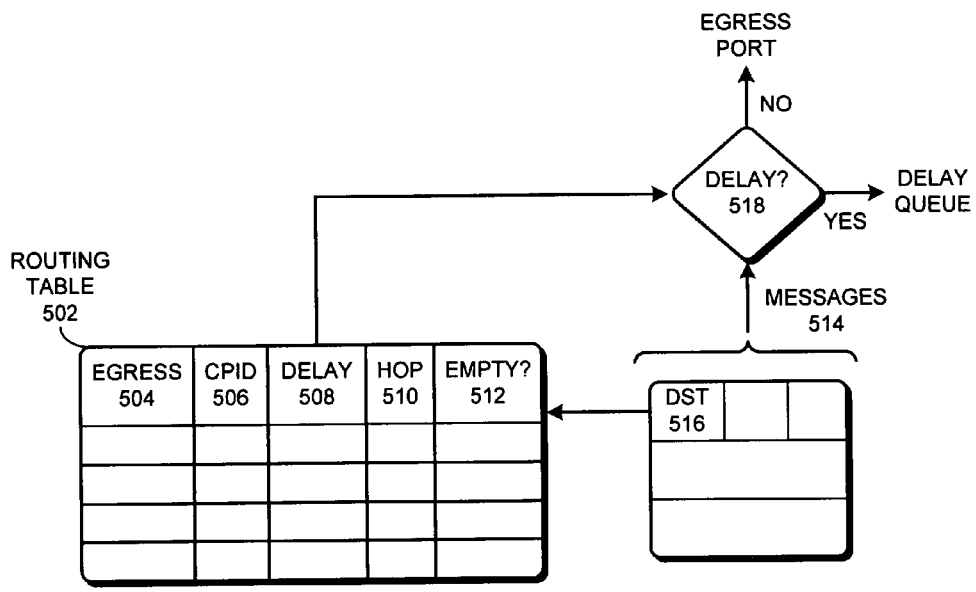
FIG. 5 illustrates how a node may determine whether to delay a message in accordance with an embodiment of the present invention.

FIG. 5 illustrates how a node may determine whether to delay a message in accordance with an embodiment of the present invention.

In one embodiment, a node may use a routing table or a forwarding table to determine whether to delay a message. For example, node 354 may use routing table 502 to determine whether to delay a message. Routing table 502 may include fields such as, egress port field 504, congestion-point identifier field 506, delay amount field 508, and hop field 510. Routing table 502 may also include an empty flag 512 which indicates whether delay queue 370 contains a message that is to be routed through the egress port specified in the egress port field 504. Note that routing table 502 may include other fields (not shown) which may help node 354 to determine how to route messages through the network. Routing table 502 has been presented only for purposes of illustration and description, and is not intended to be exhaustive or to limit the present invention to the forms disclosed. Accordingly, many modifications and variations of routing table 502 will be apparent to practitioners skilled in the art. In general, a routing table contains information that enables a node to determine how to route messages through a network. A routing table can be implemented using hardware, or software, or a combination thereof.

Node 354 may receive messages 514, wherein each message may contain a destination address 516. Node 354 may use destination address 516 and routing table 502 to determine whether to delay the message or not (step 518).

In one embodiment, node 354 may determine an egress port for a message using the message's destination address 516. Further, node 354 may use destination address 516 to determine whether the message is expected to be routed through a specific queue in a downstream node.

For example, node 354 may use the destination address to determine that a message will be routed through port 362 and through queue 356. Next, node 354 may use the egress port field 504 and congestion-point identifier field 506 to identify a row in routing table 502 that matches port 362 and queue 356. Node 354 may then use the delay field 508, hop field 510, and the empty flag 512 to determine whether to queue the message in delay queue 370.

Specifically, node 354 may queue the message in delay queue 370 if (a) the delay timer specified in the delay field 508 has not expired, and the number of hops from node 354 to the node that contains the queue associated with the congestion-point identifier is less than the number of hops specified in the hop field 510, or (b) the delay timer specified in the delay field 508 has expired, but the empty flag 512 indicates that delay queue 370 contains a message that is expected to be routed through the queue associated with the congestion-point identifier.

On the other hand, if the node determines not to delay the message, the node may send the message to an egress port. For example, node 354 may send the message to egress port 360.

The delay amount can be specified in the control message. In one embodiment, the delay amount can be determined during onset detection. Specifically, when the system detects an onset of congestion, it can also determine the delay required to combat the congestion. In one embodiment, the system can learn the parameters which indicate an onset of congestion. The system can also learn the duration of the burst and learn an optimal delay using these parameters. Alternatively, a system administrator may also set the delay amount.

Once the delay timer expires, an embodiment may transmit messages at a lower rate from the delay queue. For example, in one embodiment, the system may rearrange the messages in the delay queue so that the system alternately sends messages associated with a first congestion-point identifier and a second congestion-point identifier.

In one embodiment, once node 352 detects an onset of congestion in queue 356, it may delay message in a delay queue (not shown) at node 352. Node 352 may generate a control message only if the number of messages in the delay queue rises above a certain threshold. In a shared memory switch, this technique may not be very useful. However, in a non-shared-memory switch (e.g., a cross-bar switch), this technique may be useful because it may allow the output queues in the non-shared-memory switch to share the delay queue to store overflow messages.

Figure 6A:
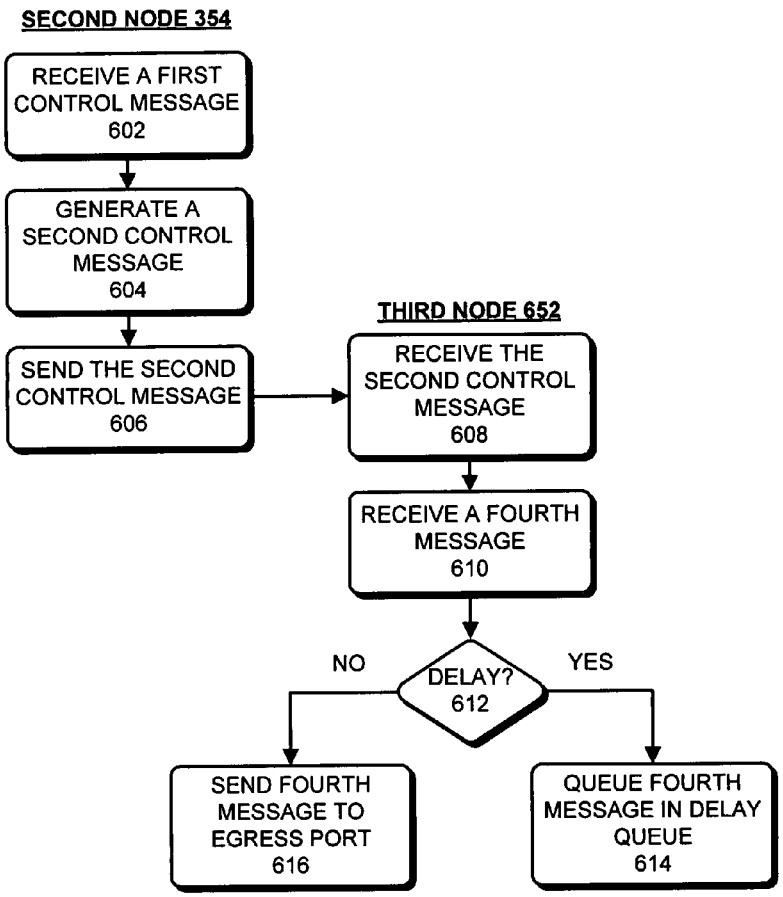
FIG. 6A presents a flowchart that illustrates a process for avoiding network congestion by propagating a control message through the network in accordance with an embodiment of the present invention.

FIG. 6A presents a flowchart that illustrates a process for avoiding network congestion by propagating a control message through the network in accordance with an embodiment of the present invention.

Figure 6B:
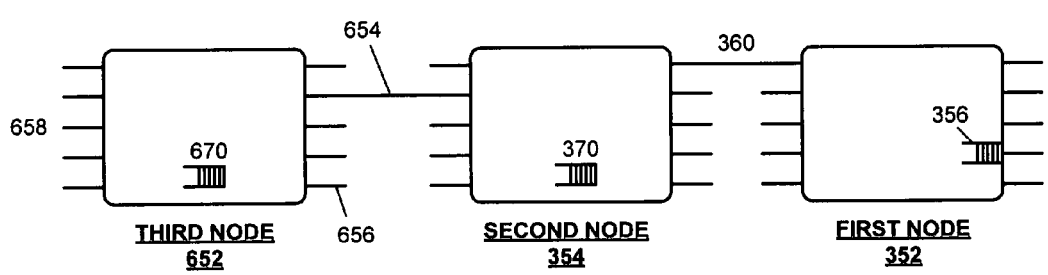
FIG. 6B illustrates how a control message can be propagated through the network in accordance with an embodiment of the present invention.

FIG. 6B illustrates how a control message can be propagated through the network in accordance with an embodiment of the present invention.

The process can begin when a second node receives a first control message (step 602). For example, second node 354 may receive a first control message from first node 352. Note that the first control message may contain a congestion-point identifier which indicates that an onset of congestion was detected in queue 356.

Next, the second node may generate a second control message (step 604). The second control message may contain information from the first control message. Specifically, the second control message may contain the congestion-point identifier associated with queue 356. Further, if the control messages include a hop count, the second node may decrement the hop count.

The second node may then send the second control message to a third node (step 606). For example, second node 354 may send the second control message to third node 652 through link 654. Note that link 654 couples second node 354 with third node 652. In one embodiment, second node 354 may send the second control message to third node 652 only if the hop count of the second control message is greater than zero.

Next, the third node may receive the second control message (step 608). For example, third node 652 may receive the second control message from second node 354 via link 654.

The third node may then receive a fourth message (step 610). For example, third node 652 may receive the fourth message on port 658. The second control message may enable third node 652 to determine whether the fourth message is expected to be routed through queue 356 at first node 352.

Next, the third node can use the information contained in the second control-message to determine whether to delay the fourth message (step 612).

If the third node determines that the fourth message is to be delayed, it can delay the fourth message by queuing the fourth message in a delay queue at the third node (step 614). For example, third node 652 can delay the fourth message by queuing the fourth message in delay queue 670.

On the other hand, if the third node determines that the fourth message is not to be delayed, it can send the fourth message to the appropriate egress port (step 616). For example, third node 652 can send the fourth message to egress port 656.

In one embodiment, the first node can send a routing-information message to the second node, which can enable the second node to determine whether a message is expected to be routed through the first queue at the first node. Further, the second node can send a routing-information message to the third node, which can enable the third node to determine whether a message is expected to be routed through the first queue at the first node. In one embodiment, a routing-information message may include one or more congestion-point identifiers.

The first node may send the routing-information message to the second node on a periodic basis. Alternatively, the first node may send the routing-information message to the second node in response to a request from the second node. Specifically, the second node may receive a control message that contains a congestion-point identifier. Next, the second node may send a routing-information request to the first node to request information that will enable the second node to determine whether a message is expected to be routed through the queue associated with the congestion-point identifier. In response to the request message, the first node may send a routing-information message to the second node.

The routing-information message may include a list of address prefixes, wherein a message is expected to be routed through the queue associated with the congestion-point identifier if and only if the message's destination address matches an address prefix in the list of address prefixes.

In one embodiment, the routing information can be piggybacked with an existing routing protocol. In a distance-vector routing protocol, a node usually receives routing tables from its immediate neighbors. Hence, additional information about the routing tables of other nodes may need to be sent. However, in link-state routing protocols, the topology of the entire network may be available at each node. Hence, additional routing-information may not need to be exchanged. Specifically, once a node knows which link is congested, it may be able to use the network topology to determine which messages are expected to be routed through the congested link.

Figure 7:
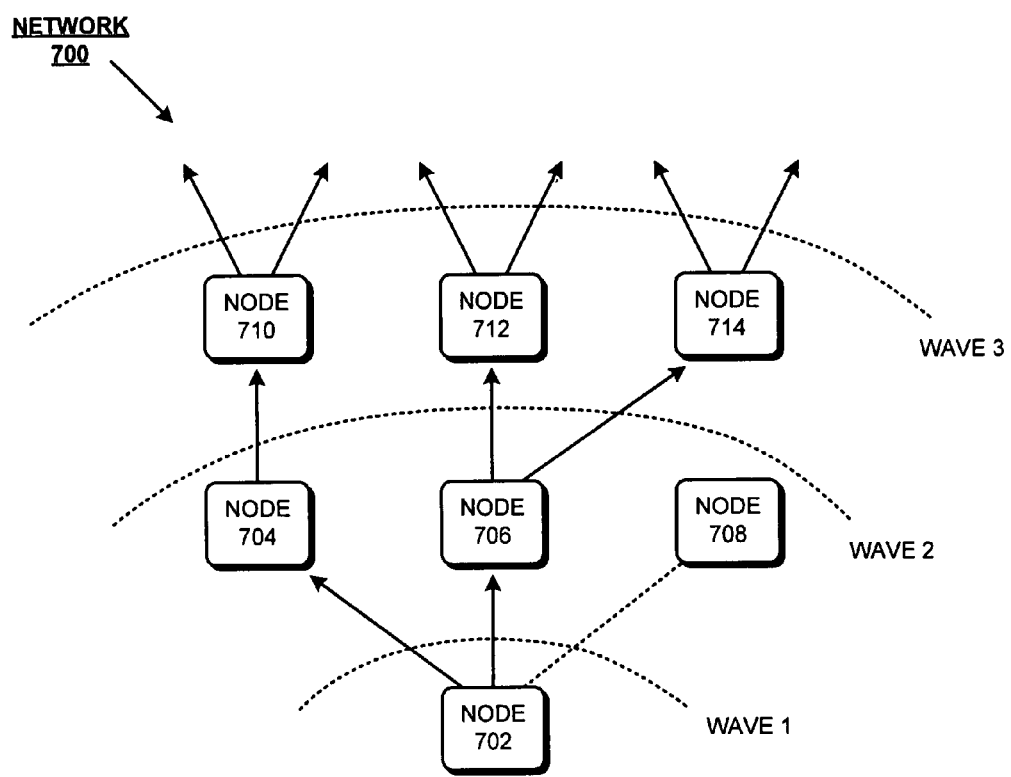
FIG. 7 illustrates how a control message can be propagated through the network in accordance with an embodiment of the present invention.

FIG. 7 illustrates how a control message can be propagated through the network in accordance with an embodiment of the present invention.

Network 700 comprises nodes 702, 704, 706, 708, 710, 712, and 714. Node 702 is coupled with nodes 704, 706, and 708; node 706 is coupled with nodes 712 and 714; and node 704 is coupled with node 710.

A node may send a control message to only some of its neighbors. For example, even though node 702 is coupled with node 708, node 702 may not send a control message to node 708.

In one embodiment, a node may send a control message to a neighboring node only if the node has received a message from a neighboring node that is expected to be routed through a congested downstream queue. For example, node 702 may detect an onset of congestion in a queue. Next, node 702 may determine that the queue contains messages that were received from nodes 704 and 706, but does not contain any messages that were received from node 708. Hence, node 702 may send control messages to nodes 704 and 706, but not to node 708.

In another embodiment, node 702 may send control messages to all neighboring nodes regardless of whether the congested queue contains a message from the neighboring nodes.

The number of hops that a control message is propagated may depend on the size of the queues and the duration of the traffic bursts. If the queues are large and the traffic bursts are short, the control messages may only need to be propagated one hop. On the other hand, if the queues are short and the traffic bursts are long, the congestion messages may need to be propagated for more than one hop. At one extreme, the system can inform all upstream nodes about an onset of congestion.

In one embodiment, control messages are propagated through the network using a high priority or a guaranteed path. This can ensure that control messages are quickly propagated through the network even if the network is heavily congested. Further, in one embodiment, messages held in delay queues are "unfrozen" in a staggered fashion in inverse order of the control message propagation. That is, messages nearest to the congestion point may resume before messages that are farther away.

The above techniques for propagating control messages have been presented only for purposes of illustration and description, and are not intended to be exhaustive or to limit the present invention to the forms disclosed. Accordingly, many modifications and variations will be apparent to practitioners skilled in the art.

In one scenario, node 702 may send control messages to nodes 704 and 708 to indicate that it has detected an onset of congestion in a queue. Upon receiving the control message from node 702, node 706 may send control message to nodes 712 and 714. Similarly, upon receiving the control message from node 702, node 704 may send a control message to node 710. Further, nodes 710, 712, and 714 may send further control messages to their neighbors (not shown).

Note that the propagation of the control message can be viewed as a propagating wavefront as shown in FIG. 7. Wavefront 1 comprises the control messages that are sent by node 702. Wavefront 2 comprises the control messages that are sent by nodes 704 and 706. Wavefront 3 comprises the control messages that are sent by nodes 710, 712, and 714. Note that the control message may reach the source. Further, queues in the destination node typically do not congest because we assume that the destination node can handle data at the line rate.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to avoid network congestion, the method comprising:
   detecting an onset of congestion in a first queue at a first node, wherein the first node is coupled to a second node using a first link, wherein the onset of congestion is based at least on a threshold and a difference between an arrival rate of the first queue and an egress rate of the first queue; and wherein the threshold is based at least on a burst duration and the number of messages in the first queue;
   generating a first control-message at the first node, wherein the first control-message contains a congestion-point identifier which is associated with the first queue; and
   sending the first control-message to the second node through the first link, which causes the second node to delay sending a second message to the first node, wherein the second message is expected to be routed through the first queue at the first node, and wherein sending the first control-message to the second node causes the second node not to delay sending a third message to the first node, wherein the third message is not expected to be routed through the first queue at the first node.

2. The method of claim 1, wherein the first queue contains a first message that was received from the second node.

3. The method of claim 1, comprising:
   receiving the first control-message at the second node, wherein the first control-message contains the congestion-point identifier;
   receiving the second message at the second node, wherein the second message is expected to be routed through the first queue at the first node;
   using information contained in the first control-message to determine whether to delay the second message; and
   delaying the second message.

4. The method of claim 3, comprising:
   generating a second control-message at the second node, wherein the second control-message contains the congestion-point identifier; and
   sending the second control-message to a third node through a second link, wherein the second node is coupled to the third node using the second link;
   wherein sending the second control-message to the third node causes the third node to delay sending a fourth message to the second node, wherein the fourth message is expected to be routed through the first queue at the first node.

5. The method of claim 1, comprising sending a routing-information message to the second node, wherein the routing-information message contains the congestion-point identifier, and wherein the routing-information message enables the second node to determine whether the second message is expected to be routed through the first queue at the first node.

6. A method to avoid network congestion, the method comprising:
   receiving a first control-message at a second node from a first node, wherein the first control-message contains a congestion-point identifier which is associated with a first queue at the first node;
   receiving a second message at the second node, wherein the second message is expected to be routed through the first queue at the first node;
   using information contained in the first control-message to determine whether to delay the second message;
   delaying the second message by queuing the second message in a second delay-queue at the second node;
   generating a second control-message at the second node, wherein the second control-message contains the congestion-point identifier; and
   sending the second control-message to a third node through a second link, wherein the second node is coupled to the third node using the second link;
   wherein sending the second control-message to the third node causes the third node to delay sending a third message to the second node, wherein the third message is expected to be routed through the first queue at the first node.

7. The method of claim 6, comprising receiving a first routing-information message at the second node from the first node, wherein the first routing-information message enables the second node to determine whether the second message will be routed through the first queue at the first node.

8. The method of claim 6, comprising sending a second routing-information message to the third node, wherein the second routing-information message enables the third node to determine whether the third message is expected to be routed through the first queue at the first node.

9. A computer-readable storage medium storing computer executable instructions that when executed by a computer cause the computer to perform a method to avoid network congestion, the method comprising:
   detecting an onset of congestion in a first queue at a first node, wherein the first node is coupled to a second node using a first link, wherein the onset of congestion is based at least on a threshold and a difference between an arrival rate of the first queue and an egress rate of the first queue; and wherein the threshold is based at least on a burst duration and the number of messages in the first queue;
   generating a first control-message at the first node, wherein the first control-message contains a congestion-point identifier which is associated with the first queue; and
   sending the first control-message to the second node through the first link, which causes the second node to delay sending a second message to the first node, wherein the second message is expected to be routed through the first queue at the first node, and wherein sending the first control-message to the second node causes the second node not to delay sending a third message to the first node, wherein the third message is not expected to be routed through the first queue at the first node.

10. The computer-readable storage medium of claim 9, wherein the first queue contains a first message that was received from the second node.

11. The computer-readable storage medium of claim 9, comprising:
   receiving the first control-message at the second node, wherein the first control-message contains the congestion-point identifier;
   receiving the second message at the second node, wherein the second message is expected to be routed through the first queue at the first node;
   using information contained in the first control-message to determine whether to delay the second message; and
   delaying the second message.

12. The computer-readable storage medium of claim 11, comprising:
   generating a second control-message at the second node, wherein the second control-message contains the congestion-point identifier; and
   sending the second control-message to a third node through a second link, wherein the second node is coupled to the third node using the second link;
   wherein sending the second control-message to the third node causes the third node to delay sending a fourth message to the second node, wherein the fourth message is expected to be routed through the first queue at the first node.

13. The computer-readable storage medium of claim 9, comprising sending a routing-information message to the second node, wherein the routing-information message contains the congestion-point identifier, and wherein the routing-information message enables the second node to determine whether the second message is expected to be routed through the first queue at the first node.

14. A computer-readable storage medium storing computer executable instructions that when executed by a computer cause the computer to perform a method to avoid network congestion, the method comprising:
   receiving a first control-message at a second node from a first node, wherein the first control-message contains a congestion-point identifier which is associated with a first queue at the first node;
   receiving a second message at the second node, wherein the second message is expected to be routed through the first queue at the first node;
   using information contained in the first control-message to determine whether to delay the second message;
   delaying the second message by queuing the second message in a second delay-queue at the second node;
   generating a second control-message at the second node, wherein the second control-message contains the congestion-point identifier; and
   sending the second control-message to a third node through a second link, wherein the second node is coupled to the third node using the second link;
   wherein sending the second control-message to the third node causes the third node to delay sending a third message to the second node, wherein the third message is expected to be routed through the first queue at the first node.

15. The computer-readable storage medium of claim 14, comprising receiving a first routing-information message at the second node from the first node, wherein the first routing-information message enables the second node to determine whether the second message will be routed through the first queue at the first node.

16. The computer-readable storage medium of claim 14, comprising sending a second routing-information message to the third node, wherein the second routing-information message enables the third node to determine whether the third message is expected to be routed through the first queue at the first node.

17. An apparatus to avoid network congestion, the apparatus comprising:
   a detecting mechanism configured to detect an onset of congestion in a first queue at a first node, wherein the first node is coupled to a second node using a first link, wherein the onset of congestion is based at least on a threshold and a difference between an arrival rate of the first queue and an egress rate of the first queue; and wherein the threshold is based at least on a burst duration and the number of messages in the first queue;
   a first generating mechanism configured to generate a first control-message at the first node, wherein the first control-message contains a congestion-point identifier which is associated with the first queue; and
   a first sending mechanism configured to send the first control-message to the second node through the first link, wherein sending the first control-message to the second node causes the second node to delay sending a second message to the first node, wherein the second message is expected to be routed through the first queue at the first node, and wherein sending the first control-message to the second node causes the second node not to delay sending a third message to the first node, wherein the third message is not expected to be routed through the first queue at the first node.

18. The apparatus of claim 17, wherein the first queue contains a first message that was received from the second node.

19. The apparatus of claim 17, comprising:
   a first receiving mechanism configured to receive the first control-message at the second node, wherein the first control-message contains the congestion-point identifier;
   a second receiving mechanism configured to receive the second message at the second node, wherein the second message is expected to be routed through the first queue at the first node;
   a determining mechanism configured to use information contained in the first control-message to determine whether to delay the second message; and
   a delaying mechanism configured to delay the second message.

20. The apparatus of claim 19, comprising:
   a second generating mechanism configured to generate a second control-message at the second node, wherein the second control-message contains the congestion-point identifier; and
   a second sending mechanism configured to send the second control-message to a third node through a second link, wherein the second node is coupled to the third node using the second link;
   wherein sending the second control-message to the third node causes the third node to delay sending a fourth message to the second node, wherein the fourth message is expected to be routed through the first queue at the first node.

21. The apparatus of claim 17, comprising a third sending mechanism configured to send a routing-information message to the second node, wherein the routing-information message contains the congestion-point identifier, and wherein the routing-information message enables the second node to determine whether the second message is expected to be routed through the first queue at the first node.

22. An apparatus to avoid network congestion, the apparatus comprising:
- a first receiving mechanism configured to receive a first control-message at a second node from a first node, wherein the first control-message contains a congestion-point identifier which is associated with a first queue at the first node;
- a second receiving mechanism configured to receive a second message at the second node, wherein the second message is expected to be routed through the first queue at the first node;
- a determining mechanism configured to use information contained in the first control-message to determine whether to delay the second message;
- a delaying mechanism configured to delay the second message by queuing the second message in a second delay-queue at the second node;
- a generating mechanism configured to generate a second control-message at the second node, wherein the second control-message contains the congestion-point identifier; and
- a first sending mechanism configured to send the second control-message to a third node through a second link, wherein the second node is coupled to the third node using the second link;
- wherein sending the second control-message to the third node causes the third node to delay sending a third message to the second node, wherein the third message is expected to be routed through the first queue at the first node.

23. The apparatus of claim 22, comprising a third receiving mechanism configured to receive a first routing-information message at the second node from the first node, wherein the first routing-information message enables the second node to determine whether the second message will be routed through the first queue at the first node.

24. The apparatus of claim 22, comprising a second sending mechanism configured to send a second routing-information message to the third node, wherein the second routing-information message enables the third node to determine whether the third message is expected to be routed through the first queue at the first node.

* * * * *